United States Patent
Hülsmann et al.

(10) Patent No.: US 10,244,682 B2
(45) Date of Patent: Apr. 2, 2019

(54) CONVEYOR BELT AND AGRICULTURAL HARVESTER WITH A CONVEYOR BELT

(71) Applicant: Maschinenfabrik Krone Beteiligungs-GmbH, Spelle (DE)

(72) Inventors: Simon Hülsmann, Fürstenau-Hollenstede (DE); Marco Lehmann, Hörstel (DE); Klaus Martensen, Hörstel (DE); Henrik Wermes, Haren (DE)

(73) Assignee: Maschinenfabrik Krone Beteiligungs-GmbH, Spelle (DE)

( * ) Notice: Subject to any disclaimer, the term of this patent is extended or adjusted under 35 U.S.C. 154(b) by 0 days.

(21) Appl. No.: 15/439,073

(22) Filed: Feb. 22, 2017

(65) Prior Publication Data
US 2017/0245437 A1 Aug. 31, 2017

(30) Foreign Application Priority Data
Feb. 25, 2016 (DE) .................. 10 2016 002 144

(51) Int. Cl.
*A01D 61/02* (2006.01)
*A01F 15/18* (2006.01)
(Continued)

(52) U.S. Cl.
CPC .............. *A01D 61/02* (2013.01); *A01F 15/07* (2013.01); *A01F 15/18* (2013.01); *B65G 15/36* (2013.01);
(Continued)

(58) Field of Classification Search
CPC ...... F16G 3/00; F16G 3/02; F16G 3/09; F16G 1/28; F16G 3/06; F16G 3/08; F16G 3/003;
(Continued)

(56) References Cited

U.S. PATENT DOCUMENTS

| 1,629,983 A | * | 5/1927 | Andersson | ................ F16G 3/06 24/37 |
| 1,991,545 A | * | 2/1935 | Croft | ........................ F16G 5/10 24/37 |

(Continued)

FOREIGN PATENT DOCUMENTS

| DE | 2357994 A | * | 6/1974 | ............... B29H 5/16 |
| DE | 297 15 387 | | 1/1998 | |

(Continued)

*Primary Examiner* — Arpad Fabian-Kovacs
(74) *Attorney, Agent, or Firm* — Gudrun E. Huckett

(57) ABSTRACT

A conveyor belt has one or more conveyor belt segments made of an elastomeric material layer and a reinforcement layer of steel ropes disposed in the elastomeric material layer and oriented in a longitudinal direction of the conveyor belt segment. The conveyor belt segments each have a first segment end provided with a first transverse lock bar and a second segment end provided with a second transverse lock bar, wherein ends of the steel ropes are locked frictionally or with form fit in the first and second transverse lock bars, respectively. One or more detachable closure members couple the first and second transverse lock bars of a single one or of adjacently positioned ones of the conveyor belt segments to each other in a rigid correlation relative to each other.

18 Claims, 7 Drawing Sheets

(51) Int. Cl.
  *B65G 15/52* (2006.01)
  *F16G 3/08* (2006.01)
  *A01F 15/07* (2006.01)
  *B65G 15/36* (2006.01)
(52) U.S. Cl.
  CPC .............. *B65G 15/52* (2013.01); *F16G 3/08* (2013.01); *A01F 2015/183* (2013.01)
(58) Field of Classification Search
  CPC ........... F16G 5/10; B65G 15/30; B65G 15/50; A01F 2015/0795; A01F 15/0833; A01F 2015/077; A01F 15/07; A01F 2015/078; A01F 2015/183
  See application file for complete search history.

(56) References Cited

U.S. PATENT DOCUMENTS

| | | | | |
|---|---|---|---|---|
| 2,265,604 | A * | 12/1941 | Knoedler | F16G 3/00 24/31 C |
| 2,449,950 | A * | 9/1948 | Nassimbene | F16G 7/00 24/31 W |
| 2,496,695 | A * | 2/1950 | Brunner | F16G 7/00 24/31 R |
| 3,181,690 | A | 5/1965 | Jenkins | |
| 3,327,359 | A * | 6/1967 | Wiese | F16G 3/00 24/31 W |
| 3,810,278 | A * | 5/1974 | Kenney | F16G 3/00 24/31 W |
| 4,550,557 | A * | 11/1985 | Vissers | A01F 15/07 100/89 |
| 4,617,716 | A * | 10/1986 | Lay | D01F 9/32 24/31 B |
| 4,912,812 | A * | 4/1990 | Henn | F16G 3/00 24/31 R |
| 5,348,143 | A * | 9/1994 | Musil | B65G 15/30 198/844.2 |
| 5,360,103 | A * | 11/1994 | Loosli | B65G 15/30 198/844.2 |
| 8,770,394 | B2 * | 7/2014 | Huels | F16G 3/02 198/844.2 |
| 9,248,970 | B2 * | 2/2016 | Schneider | B65G 17/42 |
| 9,365,350 | B2 * | 6/2016 | Sherwood | B65G 21/22 |
| 9,683,630 | B2 * | 6/2017 | Vollbarth | F16G 1/28 |
| 2004/0195079 | A1 * | 10/2004 | Webster | B65G 15/52 198/844.2 |
| 2005/0252388 | A1 * | 11/2005 | Krone | A01F 15/0833 100/88 |
| 2005/0252389 | A1 * | 11/2005 | Krone | A01F 15/0833 100/88 |
| 2009/0301845 | A1 * | 12/2009 | DeGroot | B29C 65/564 198/844.2 |
| 2010/0029426 | A1 * | 2/2010 | Pons Sanchez | F16G 1/28 474/206 |
| 2012/0205223 | A1 * | 8/2012 | Moeschen-Siekmann | F16G 3/09 198/844.2 |
| 2013/0213774 | A1 | 8/2013 | Huels et al. | |
| 2017/0023101 | A1 * | 1/2017 | Jager | F16G 3/06 |
| 2017/0081124 | A1 * | 3/2017 | Steinert | B65G 39/20 |

FOREIGN PATENT DOCUMENTS

| | | | |
|---|---|---|---|
| DE | 10 2004 023 704 | 12/2005 | |
| DE | 10 2010 054 186 | 6/2012 | |
| JP | 01203732 A * | 8/1989 | ............... F16G 3/00 |
| WO | 2012/038155 | 3/2012 | |

\* cited by examiner

CONVEYOR BELT AND AGRICULTURAL HARVESTER WITH A CONVEYOR BELT

BACKGROUND OF THE INVENTION

The invention concerns a conveyor belt or a conveyor belt segment of an elastomeric material with a reinforcement layer of steel ropes arranged so as to be oriented in longitudinal direction of the conveyor belt, wherein each conveyor belt end or conveyor belt segment end comprises a transverse lock bar in which the ends of the steel ropes are locked frictionally or with form fit. The invention also concerns an agricultural harvester for harvesting field crops or suchlike harvested crop with at least one device for processing and/or conveying the field crops. Such conveyor belts and their use are known from various applications.

WO 2012/038155 A1 discloses a conveyor belt or conveyor belt segment in which a reinforcement layer of steel ropes arranged in longitudinal direction of the conveyor belt and aligned parallel to each other provide for a sufficiently high tensile force that can be transmitted by such conveyor belts. On the top side or bottom side, the reinforcement layer is covered by cover layers of an elastomeric material. For connecting the two ends of the conveyor belt or the ends of at least two conveyor belt segments, the publication proposes hinge plates which are provided with appropriate longitudinal bores for receiving the steel ropes. For fixation of the steel ropes in the longitudinal bores of the hinge plates, compression of the hinge plates is provided. Due to the compressive connections in the hinge plates for attachment of the wire ropes with the hinge plates, a limited flexibility of the conveyor belt results, in particular for deflection at guide and idler pulleys with small diameters.

Moreover, DE 10 2004 023 704 A1 discloses an agricultural harvester in the form of a round bale press for collecting and pressing agricultural harvested crop in which a bale forming device is formed of two drive belts with pressing rods arranged therebetween. Based on the knowledge that the drive belts in question are endless belts, in practice a plurality of different belt lengths for different bale sizes are required which must be stockpiled, respectively.

Object of the invention is therefore to provide a conveyor belt of conveyor belt segments which can be produced and assembled in a simple and inexpensive way, provides an optimal flexibility at the same time, and therefore simplifies the use in agricultural harvesters.

SUMMARY OF THE INVENTION

According to the invention, the aforementioned object is solved by a conveyor belt or conveyor belt segment in that the transverse lock bars of two conveyor belt ends or conveyor belt segment ends can be coupled to each other by a detachable closure member in a rigid correlation relative to each other. The invention is further solved by an agricultural harvester for harvesting field crops in that the device for processing and/or conveying the field crops comprises at least one conveyor belt or conveyor belt segment according to the invention, on which rod elements are attached that are at least approximately oriented transverse to the running direction of the conveyor belt or of the conveyor belt segment. Preferred embodiments of the invention are subject matter of the dependent claims.

According to the invention, a conveyor belt or conveyor belt segment of an elastomeric material is proposed, comprising a reinforcement layer of steel ropes arranged so as to be oriented in longitudinal direction of the conveyor belt or of the conveyor belt segment, wherein each conveyor belt end or conveyor belt segment end comprises a transverse lock bar in which the ends of the steel ropes are locked by friction or form fit, wherein the transverse lock bars of two conveyor belt ends or conveyor belt segment ends can be coupled with each other by means of a detachable closure member in a rigid correlation relative to each other. In this way, a conveyor belt is made available that is formed of at least one conveyor belt segment wherein the respective conveyor belt segment ends are connected to each other in an extremely compact manner so that in this way a limitation of the flexibility of the conveyor belt, in particular for deflection at guide or idler pulleys with small diameters, is avoided. End members of the conveyor belt or of the conveyor belt segments embodied as transverse lock bars comprise bores distributed across their length in which the ends of the wire ropes are connected in a pull-resistant way by joining methods such as soldering, gluing, welding, compressing or clamping with the transverse lock bar. Due to these connecting techniques, such a transverse lock bar requires only a very compact cross section. Advantageously, the required cross section for a square cross section surface can have an edge length of 10 to 15 mm. Other cross section surfaces can however be employed also.

With the closure member according to the invention, a coupling action of the transverse lock bars is achieved in which a rigid correlation of the transverse lock bars relative to each other is realized. A rigid correlation is to be understood in the context of the invention in that any type of movement of two transverse lock bars relative to each other that are at least partially enclosed by the closure member is not possible. For coupling two such transverse lock bars, the closure member is formed of at least two sections that are detachably connected to each other. The sections of the closure member can be a bottom and a top section that receive between them two neighboring transverse lock bars of conveyor segments that are to be connected to a conveyor belt, for example, and provide in this way a coupling action with rigid correlation. For realizing a detachable connection between the sections of a closure member, fastening means are employed that are embodied as fastening screws, for example.

For coupling two transverse lock bars in a closure member, the sections of the closure member have recesses whose geometric dimensions are designed such that the transverse lock bars fit with form fit in the recesses. Grooves that are recessed in the surface of the sections of the closure member are suitable in particular as recesses for receiving the transverse lock bars. Preferably, the depth of the grooves is in this context in a range that is 10 to 50% of the material thickness of the sections of the closure member.

In an advantageous embodiment of the invention, it is provided that the detachably designed closure members for coupling transverse lock bars of the conveyor belt segments of the conveyor belt can be utilized as means for receiving and fastening rod elements. For this purpose, straps can adjoin the sections of a closure member for receiving the transverse lock bars and rod elements can be attached thereto that, for example, are usable in a bale forming device of a round bale press or in screen and conveyor belts of a potato harvester.

For facilitating joining of two ends of conveyor belt segments or two ends of a conveyor belt, the transverse lock bars can be furnished on the side which is facing away from the flexible belt element with means for auxiliary coupling. With the means for auxiliary coupling a preliminary connection between two transverse lock bars can be provided with the goal that then at this coupling location the two sections of the closure member can be mounted in a simple way. In an advantageous embodiment, a dovetail-shaped projection which is insertable into a dovetail-shaped cutout can be provided as means for auxiliary coupling. For making uniform the coupling locations between the respective conveyor belt segments, it is then advantageous when on each transverse lock bar a dovetail-shaped projection and a dovetail-shaped cutout are provided. In further embodiments of the invention, other configurations for auxiliary coupling are conceivable also.

In a further embodiment of the invention, an agricultural harvester for harvesting agricultural field crops or suchlike harvested crop with at least one device for processing and/or conveying the field crops is proposed in which the device for processing and/or conveying the field crops comprises at least one conveyor belt or a conveyor belt segment according to the features of claims 1 to 13, on which rod elements are attached that are at least approximately oriented transversely to the running direction of the conveyor belt or of the conveyor belt segment. It is thus proposed according to the invention to assemble conveyor belts from conveyor belt segments with same or different length. In an application in which between two conveyor belts rod elements are attached that are embodied as conveying or pressing rods, these conveyor belts can then form a bale forming device which surrounds a bale forming chamber for forming round bales. With such a configuration of the bale forming device, it is made possible that even conveyor belts of different lengths for different bale sizes can be assembled of standardized conveyor belt segments. A cost-intensive stockpiling of conveyor belts of different lengths can thus be eliminated. The manufacturing process can be significantly simplified in this way.

BRIEF DESCRIPTION OF THE DRAWINGS

In the following, an advantageous embodiment of the invention will be explained with the aid of a drawing. In the drawing, it is shown in.

DESCRIPTION OF PREFERRED EMBODIMENTS

Figure 1:
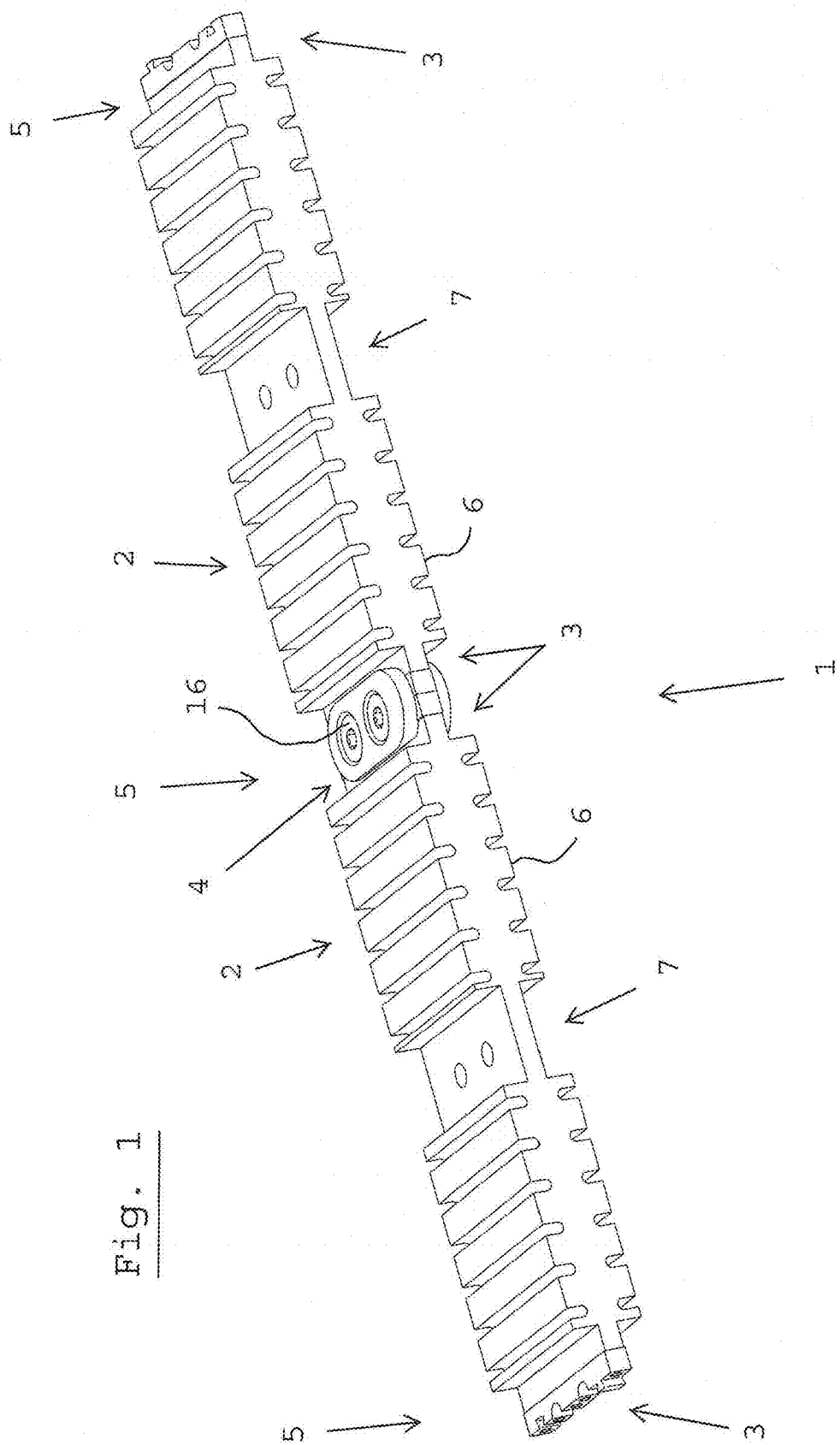
FIG. 1: a perspective view of a conveyor belt according to the invention.
Figure 2:
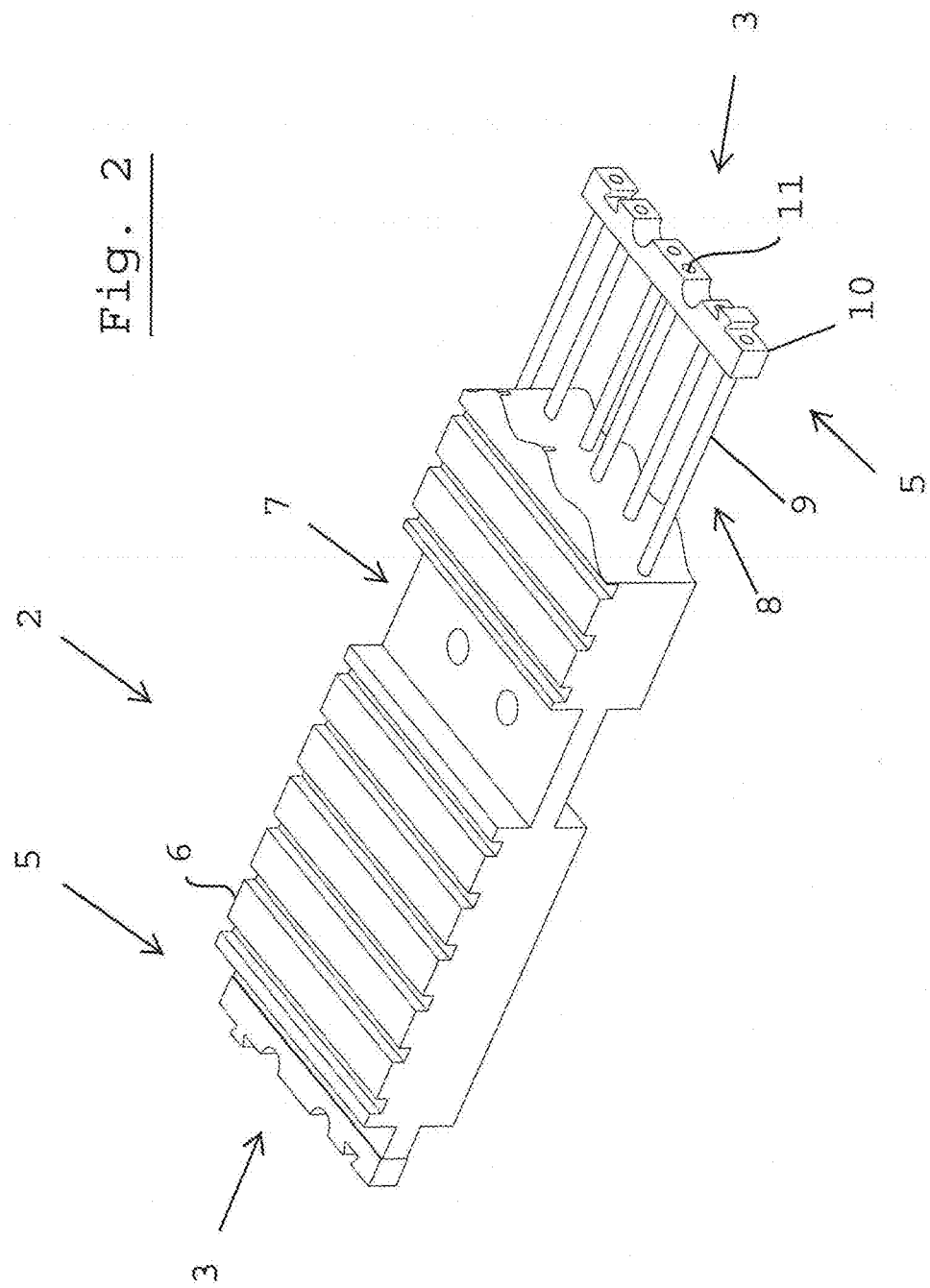
FIG. 2: a perspective view of a conveyor belt segment of a conveyor belt according to FIG. 1 in a partially broken away illustration.

In FIG. 1, a conveyor belt 1 according to the invention is illustrated in detail which is formed of at least two conveyor belt segments 2. Further advantageous embodiments of a conveyor belt 1 can however be designed also such that a plurality of standardized conveyor belt segments 2 are joined to a conveyor belt 1. As a connection between the conveyor belt ends or conveyor belt segment ends 3, a detachable closure member 4 is provided with which, at a coupling location 5, coupling of the conveyor belt ends or conveyor belt segment ends 3 with a rigid correlation relative to each other is effected. Between two coupling locations 5, a conveyor belt segment 2 comprises a flexible belt element 6 which, depending on the intended use, can be provided with different profilings. Furthermore, FIG. 1 shows that in the flexible belt element 6 also connecting locations 7 for rod elements can be provided when the conveyor belt 1, by being furnished with rod elements that are oriented at least approximately transversely to the running direction of the conveyor belt, is to be used as a device for processing and/or conveying field crops or suchlike harvested crop A detailed representation of the construction of a conveyor belt segment 2 according to the invention can be taken from FIG. 2. Based on a reinforcement layer 8 of steel ropes 9 located in the interior of the flexible belt element 6, the flexible belt element 6 comprises upper and lower cover layers that can be provided with different profilings but also without profiling. On each conveyor belt segment end 3 of a conveyor belt segment 2 the latter is provided with a transverse lock bar 10 that, with respect to its length extension, is oriented transverse to the running direction of the conveyor belt segment 2 and serves for coupling two conveyor belt segments 2 or for closing a conveyor belt segment 2 to a conveyor belt 1. The transverse lock bar 10 comprises in the running direction of the conveyor belt segment 2 a plurality of bores 11 in which the ends of steel ropes 9 are connected in a pull-resistant way to the transverse lock bar 10 by joining methods such as soldering, gluing, welding, pressing, or clamping. Moreover, the illustration of FIG. 2 shows that the transverse lock bar has a preferably square cross section whose edge lengths can be in a range of 10 to 15 mm. Thus, the transverse lock bar 10 that, for coupling, is to be connected with a further lock bar 10 of a further conveyor belt segment 2 in a rigid correlation relative to each other has an extremely compact size which reliably prevents limitations of the flexibility for deflections at guide and idler pulleys.

Figure 3:
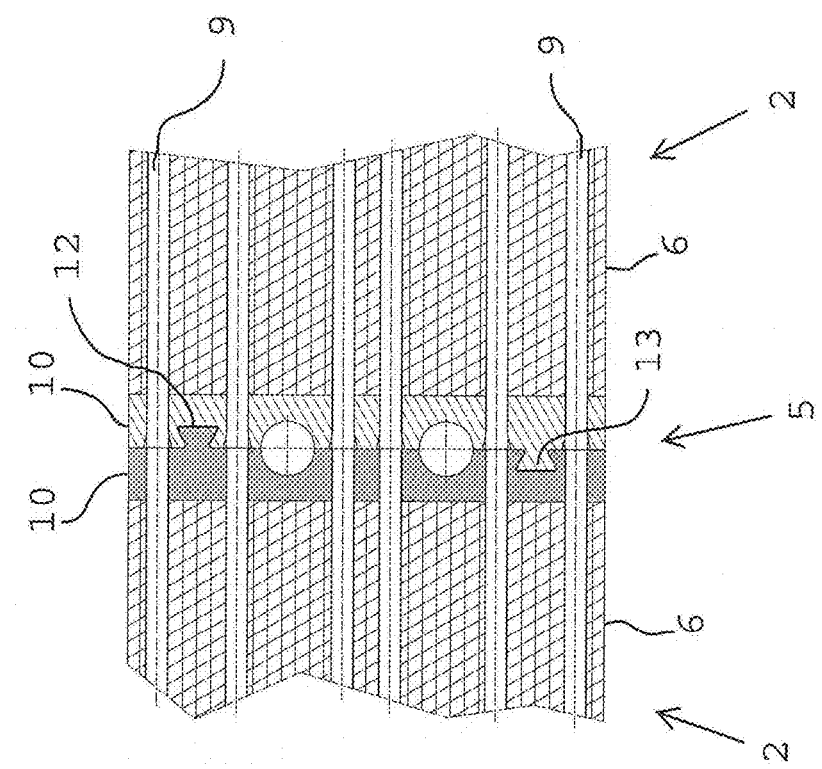
FIG. 3: a section illustration of a coupling location of two conveyor belt segments, the section taken parallel to the running surface of the conveyor belt.
Figure 4:
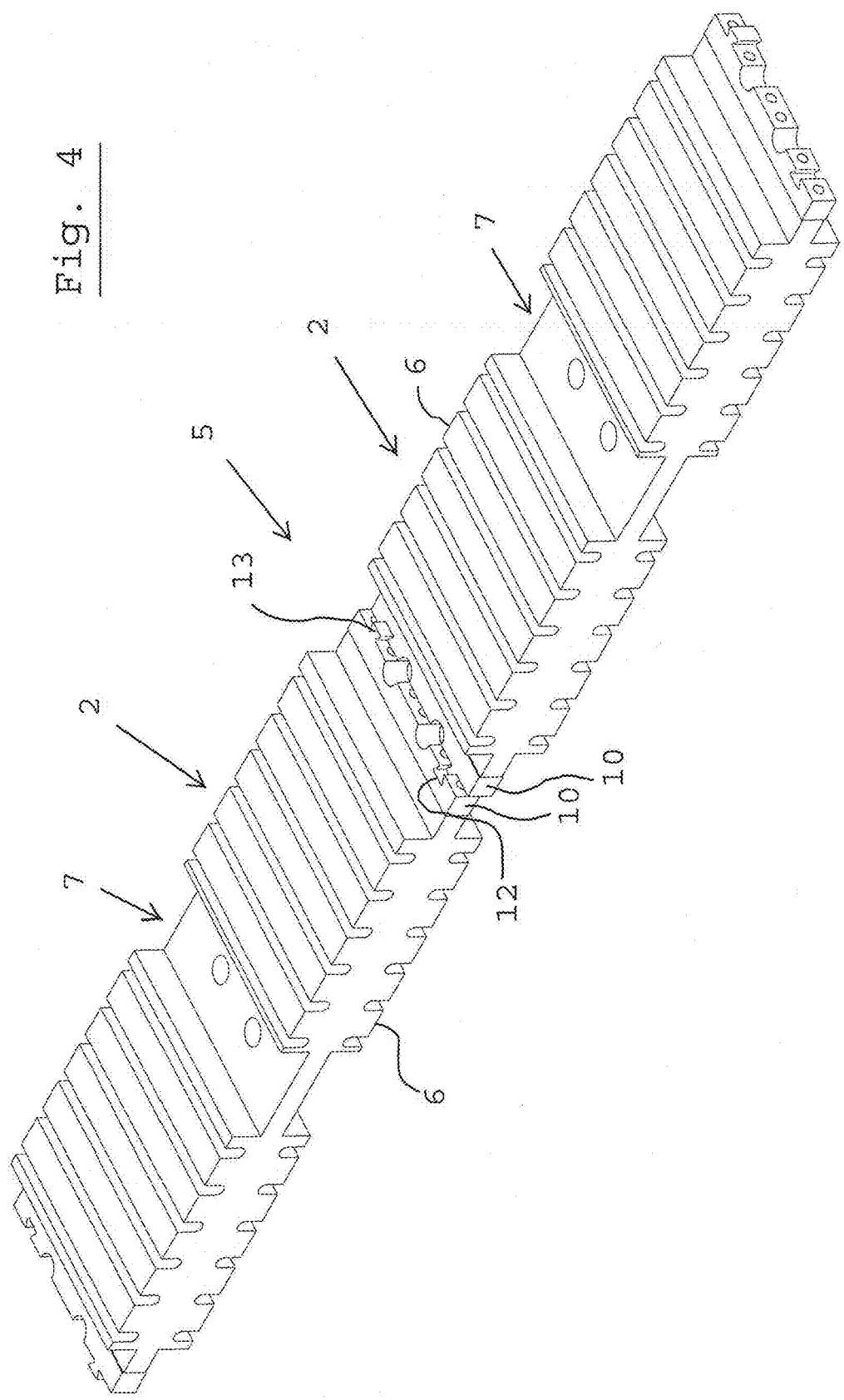
FIG. 4: a perspective view of two conveyor belt segments during an auxiliary joining process.

The illustrations of FIG. 3 and FIG. 4 show two conveyor belt segments 2 in a state of an auxiliary coupling action that serves to facilitate the attachment and fastening process of a closure member 4 in that possible pulling forces that impair the attachment and fastening process of a closure member 4 as a result of the weight effect of a conveyor belt section are already absorbed. When the auxiliary coupling action of two conveyor belt segments is completed, the closure member 4 can be unhurriedly attached and fastened. For this purpose, each transverse lock bar 10 can be provided with a dovetail-shaped cutout 12 as well as with a dovetail-shaped projection 13 on the side which is facing away from the flexible belt element 6. A transverse lock bar with a mirror-symmetrical configuration with the dovetail-shaped projection 13 and the dovetail-shaped cutout 12 can then be preliminarily coupled in a simple way with the first transverse lock bar 10.

Figure 5:
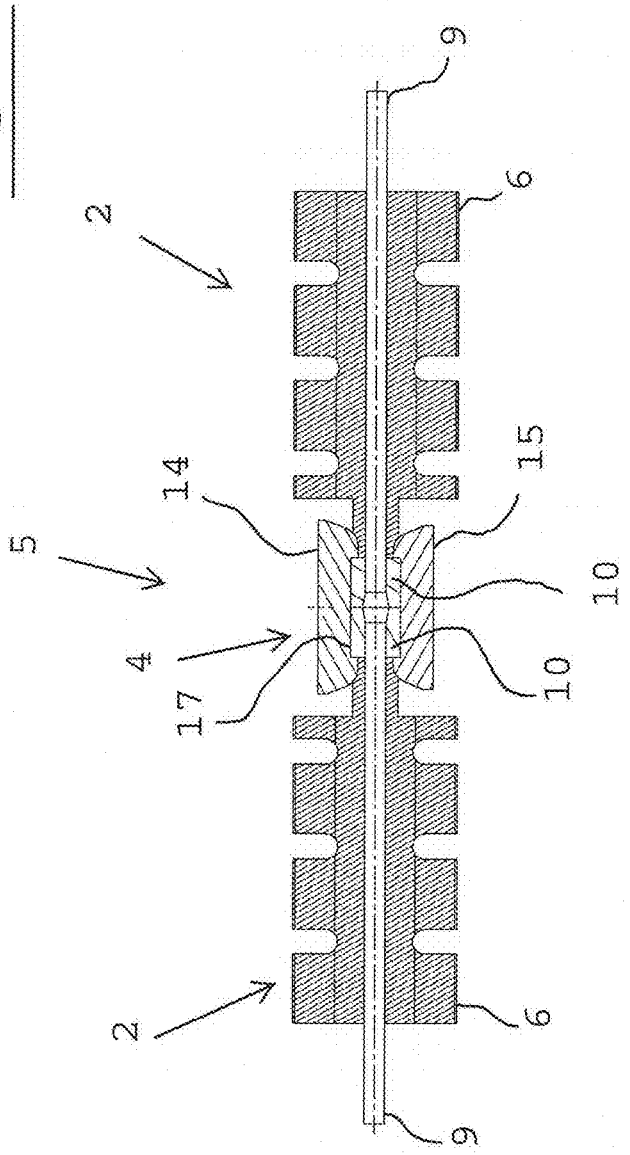
FIG. 5: a section illustration of a coupling location of two conveyor belt segments, the section taken parallel to the lateral flank of the conveyor belt.

FIG. 5 shows in a section illustration the coupling location 5 in a state in which two conveyor belt segments 2 are connected to each other by the action of the closure member according to the invention. The sides of the transverse lock bar 10 which are facing away from the flexible belt element 6 are contacting each other in the coupled state so that by engagement of the sections 14, 15 of the closure member 4 across the upper and across the lower side of the conveyor belt segment 2 a connection is realized in which a rigid correlation of the transverse lock bars 10 relative to each other occurs. When the two sections 14, 15 of the closure member 4 are now tensioned relative to each other, a form-fit connection in conveyor belts is produced that withstands even the difficult environmental conditions during use of agricultural harvesters. For tensioning the sections 14, 15 of the closure member 4 relative to each other, fastening screws 16 can be used, as they are already shown in FIG. 1. The engagement of the sections 14, 15 of the closure member 4 is achieved in that the sections 14, 15 are provided with recesses 17 into which the two transverse lock bars 10 can be inserted with form fit in regard to their cross section dimensions.

Figure 6:
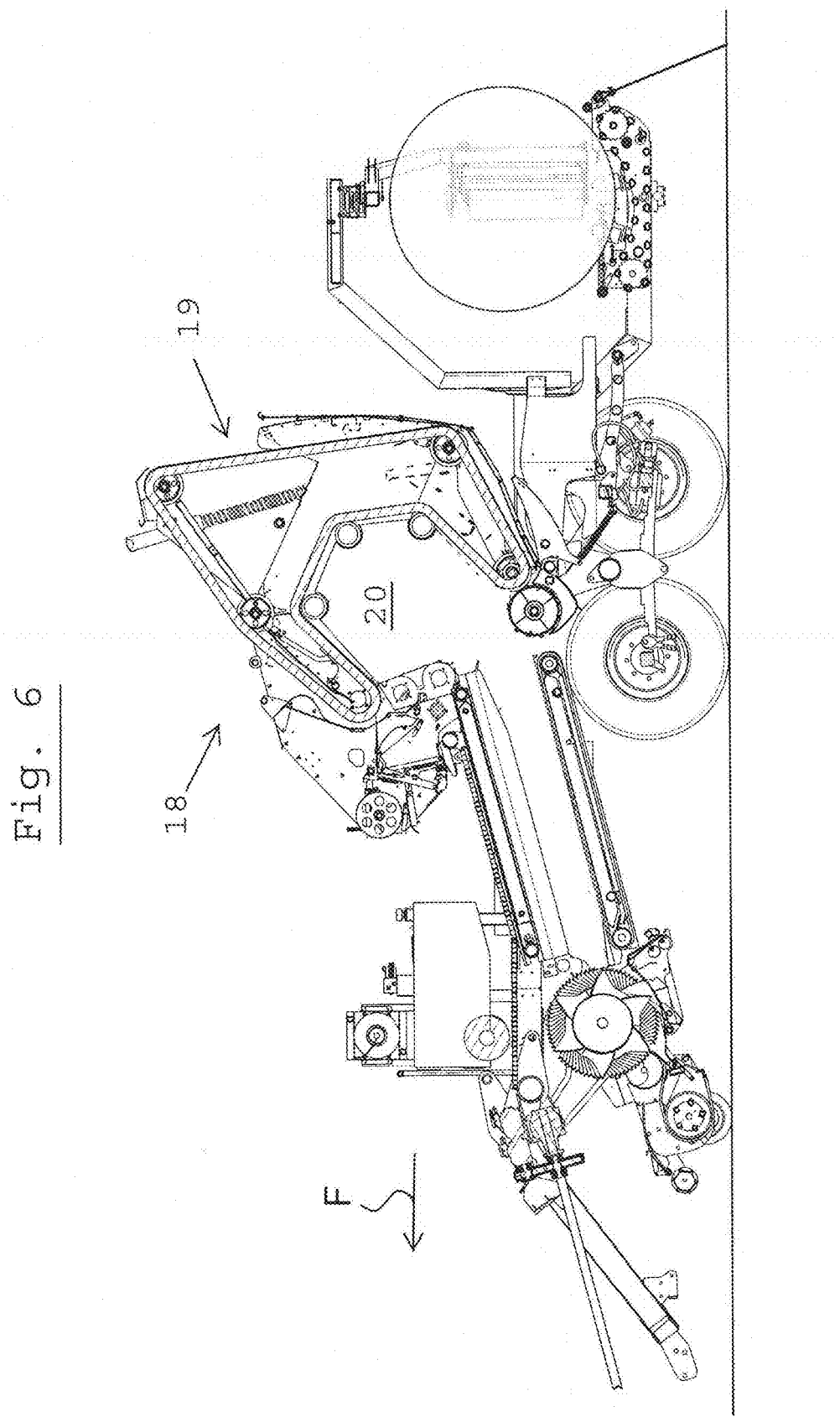
FIG. 6: a schematic illustration of an agricultural harvester with a bale forming device.
Figure 7:
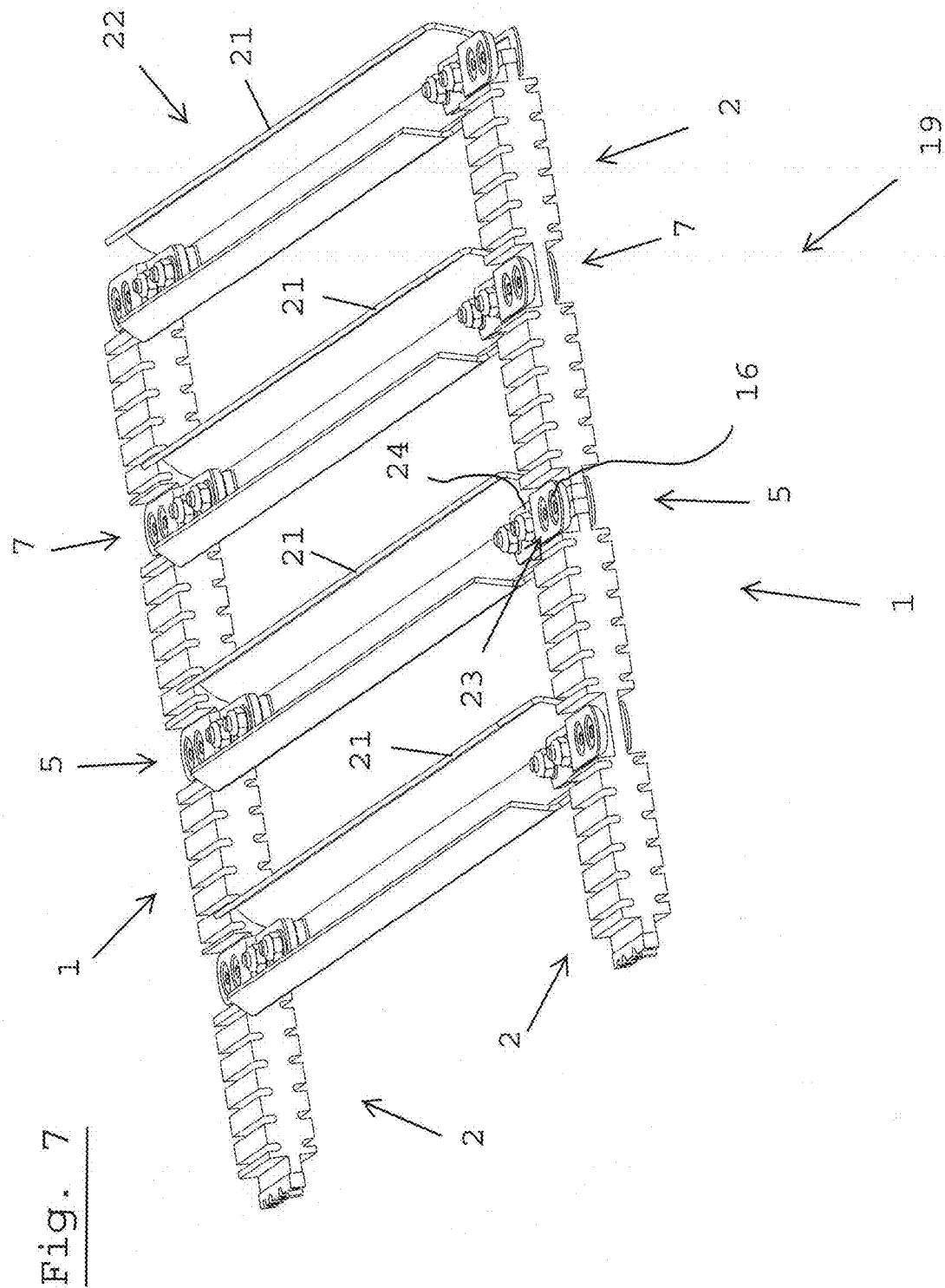
FIG. 7: a perspective view of a bale forming device according to FIG. 6.

One embodiment of an agricultural harvester in which the conveyor belts 1 according to the invention can be used, is illustrated in FIG. 6. Here, a round bale press for harvesting stalk crop is shown in which the collected harvested crop is compressed by means of a device 18 for processing and/or conveying the harvested crop in the form of a bale forming device 19 to round bales in a bale forming chamber 20. A detailed illustration of the bale forming device 19 can be taken from FIG. 7. The bale forming device 19 illustrated therein is comprised of two conveyor belts 1 between which rod elements 22 embodied as conveying and pressing rods 21 are extending. Approximately at the central area of the illustrated bale forming device 19, two coupling locations 5 are provided where two conveying belt segments 2 are coupled with each other and two conveying belt segments 2 are also connected with a conveying and pressing rod 21. For this purpose, a closure member 23 is provided which has corresponding sections 14, 15 of the closure member 4 (FIG. 5) and on which however straps 24 are attached for receiving the conveying and pressing rods 21.

What is claimed is:

1. A conveyor belt comprising:
   conveyor belt segments comprising an elastomeric material layer and a reinforcement layer of steel ropes disposed in the elastomeric material layer and arranged so as to be oriented in a longitudinal direction of the conveyor belt segments, wherein the conveyor belt segments each have a first segment end provided with a first transverse lock bar and a second segment end provided with a second transverse lock bar, wherein ends of the steel ropes are locked frictionally or with form fit in the first and second transverse lock bars, respectively;
   detachable closure members coupling the first and second transverse lock bars of adjacently positioned ones of the conveyor belt segments to each other in a rigid correlation relative to each other;
   wherein the conveyor belt segments are arranged to form a first belt and a second belt extending parallel to each other;
   rod elements oriented at least approximately transversely to a running direction of the conveyor belt, wherein the rod elements each comprise a first end disposed at the first belt and a second end disposed at the second belt, respectively;
   wherein the detachable closure members comprise fastening means fastening the first end to the first belt or the second end to the second belt, respectively.

2. The conveyor belt according to claim 1, wherein the detachable closure members enclose at least partially the first and second transverse lock bars, respectively.

3. The conveyor belt according to claim 1, wherein the detachable closure members are comprised of at least two sections connectable to each other by fasteners.

4. The conveyor belt according to claim 3, wherein the fasteners are fastening screws that at least partially penetrate the first and second transverse lock bars.

5. The conveyor belt according to claim 4, wherein the at least two sections produce a form fit connection between the at least two sections and the first and second transverse lock bars.

6. The conveyor belt according to claim 3, wherein the at least two sections produce a form fit connection between the at least two sections and the first and second transverse lock bars.

7. The conveyor belt according to claim 3, wherein the detachable closure members produce a friction connection between the at least two sections and the first and second transverse lock bars.

8. The conveyor belt according to claim 3, wherein the at least two sections have sides that are facing each other and said sides facing each other are provided with recesses, wherein a size of the recesses is matched to dimensions of the first and second transverse lock bars when contacting each other.

9. The conveyor belt according to claim 8, wherein the recesses have a depth in a range of 10% to 50% of a material thickness of the at least two sections, respectively.

10. The conveyor belt according to claim 1, wherein the detachable closure members each are comprised of at least two sections and wherein the fastening means are straps that adjoin the at least two sections, respectively.

11. The conveyor belt according to claim 1, wherein the first and second transverse lock bars are provided with means for auxiliary coupling of the first and second transverse lock bars, said means for auxiliary coupling arranged on a side of the first and second transverse lock bars that is facing away from the elastomeric material layer, respectively.

12. The conveyor belt according to claim 11, wherein the means for auxiliary coupling comprises a dovetail-shaped projection on the first transverse lock bar insertable into a dovetail-shaped cutout on the second transverse lock bar.

13. The conveyor belt according to claim 11, wherein the means for auxiliary coupling comprises a first dovetail-shaped projection and a first dovetail-shaped cutout on the first transverse lock bar and further comprises a second dovetail-shaped projection and a second dovetail-shaped cutout on the second transverse lock bar, wherein the first dovetail-shaped projection is insertable into the second dovetail-shaped cutout and the second dovetail-shaped projection is insertable into the first dovetail-shaped cutout.

14. An agricultural harvester comprising:
   at least one processing or conveying device for crops, wherein the at least one processing or conveying device for crops comprises the conveyor belt according to claim 1.

15. The agricultural harvester according to claim 14, wherein the at least one processing or conveying device for crops comprises a bale forming chamber and a bale forming device that is actuatable to perform a circulating movement and configured to compress the crops to round bales.

16. The agricultural harvester according to claim 15, wherein said conveyor belt is the bale forming device, wherein the rod elements are conveying or pressing rods.

17. The agricultural harvester according to claim 16, wherein said first and second belts are comprised of at least two of the conveyor belt segments.

18. The agricultural harvester for according to claim 16, wherein the conveying or pressing rods are screw-connected at the detachable closure members to said first and second belts.

\* \* \* \* \*